United States Patent
Voong et al.

(10) Patent No.: US 9,381,664 B2
(45) Date of Patent: Jul. 5, 2016

(54) ROTATING SAW WITH BALANCED DYNAMIC BRAKING

(71) Applicants: Robert Bosch Tool Corporation, Broadview, IL (US); Robert Bosch GmbH, Stuttgart (DE)

(72) Inventors: Gary L. Voong, Chicago, IL (US); Prashant Jayaraman, Barrington, IL (US)

(73) Assignee: Robert Bosch GmbH, Stuttgart (DE)

( * ) Notice: Subject to any disclaimer, the term of this patent is extended or adjusted under 35 U.S.C. 154(b) by 308 days.

(21) Appl. No.: 14/208,973

(22) Filed: Mar. 13, 2014

(65) Prior Publication Data
US 2014/0260845 A1    Sep. 18, 2014

Related U.S. Application Data

(60) Provisional application No. 61/781,931, filed on Mar. 14, 2013.

(51) Int. Cl.
*B27B 5/38* (2006.01)
*B23D 59/00* (2006.01)

(52) U.S. Cl.
CPC ............. *B27B 5/38* (2013.01); *B23D 59/001* (2013.01); *Y10T 83/04* (2015.04); *Y10T 83/089* (2015.04)

(58) Field of Classification Search
CPC ..... Y10T 83/04; Y10T 83/089; Y10T 83/088; Y10T 83/7693; Y10T 83/7697; Y10T 83/7701; Y10T 83/7705; Y10T 83/7726; Y10T 83/773; Y10T 83/8773; B23D 59/001; B23D 59/00; B23D 45/00; B23D 45/04; B27B 5/38; B27B 5/00; B27B 5/29
See application file for complete search history.

(56) References Cited

U.S. PATENT DOCUMENTS

| | | | |
|---|---|---|---|
| 4,267,914 A | 5/1981 | Saar | |
| 2002/0017175 A1 | 2/2002 | Gass et al. | |
| 2002/0020261 A1 | 2/2002 | Gass et al. | |
| 2005/0204885 A1 | 9/2005 | Gass et al. | |
| 2005/0268767 A1 | 12/2005 | Pierga et al. | |
| 2011/0048197 A1 | 3/2011 | Winkler | |
| 2011/0226105 A1* | 9/2011 | Butler | B27B 5/222 83/62 |
| 2011/0239837 A1 | 10/2011 | Gass et al. | |
| 2012/0137848 A1 | 6/2012 | Gass et al. | |

FOREIGN PATENT DOCUMENTS

| | | |
|---|---|---|
| WO | 03006213 A2 | 1/2003 |
| WO | 2010059786 A1 | 5/2010 |

OTHER PUBLICATIONS

International Search Report and Written Opinion corresponding to PCT Application No. PCT/US2014/026227, mailed Jul. 11, 2014 (17 pages).

* cited by examiner

*Primary Examiner* — Phong Nguyen
(74) *Attorney, Agent, or Firm* — Maginot, Moore & Beck LLP

(57) ABSTRACT

An automatic braking system for a pivoting power tool includes a cutting assembly, a cutting arm supporting the cutting assembly, a hinge supporting the cutting arm through a pivot, a primary braking system operably connected to the cutting assembly, a secondary braking system operably connected to the hinge, and a safety circuit configured to sense an unsafe condition and, in response to sensing the unsafe condition, (i) control the primary braking system to oppose rotation of a blade supported by the cutting assembly, and (ii) control the secondary braking system to oppose rotation of the cutting arm.

11 Claims, 4 Drawing Sheets

ROTATING SAW WITH BALANCED DYNAMIC BRAKING

This application claims the benefit of U.S. Provisional Application No. 61/781,931 filed Mar. 14, 2013, the entirety of which is incorporated herein by reference.

FIELD

This disclosure relates to machines such as miter saws which include protective systems configured to rapidly stop rotational movement of a shaping device.

BACKGROUND

A number of power tools have been produced to facilitate forming a work piece into a desired shape. One such power tool is a miter saw. Miter saws present a safety concern because the saw blade of the miter saw is typically very sharp and moving at a high rate of speed. Accordingly, severe injury such as severed digits and deep lacerations can occur almost instantaneously. A number of different safety systems have been developed for miter saws in response to the dangers inherent in an exposed blade moving at high speed. One such safety system is a blade guard. Blade guards movably enclose the saw blade, thereby providing a physical barrier that must be moved before the rotating blade is exposed. While blade guards are effective to prevent some injuries, a user's finger is nonetheless in proximity to the moving blade, particularly when attempting to secure a work piece as the miter saw is used to shape the work piece.

Miter saw safety systems have been developed which are intended to stop the blade when a user's hand approaches or touches the blade. Various stopping devices have been developed including braking devices which are physically inserted into the teeth of the blade. In general, upon detection of a person in the vicinity of the blade, a signal is processed and sent to a brake mechanism to stop blade rotation within a short period of time. One such system is disclosed in U.S. Patent Publication No. 2011/0048197. In other systems, a mechanical or electrical brake is used. In all of these systems, however, the short stopping time of the blade generates a large angular momentum that will either swing the head up or down (depending on blade or motor rotation direction for miter saws) with a high force which is destructive to the structure of the tool. In addition to posing a danger to the tool, the high angular momentum forces pose an additional injury risk to the user.

What is needed therefore is a simple and reliable configuration which reduces the potential for transferring high angular momentum forces to a tool thereby causing movement of the tool.

SUMMARY

In one embodiment, an automatic braking system for a pivoting power tool includes a cutting assembly, a cutting arm supporting the cutting assembly, a hinge supporting the cutting arm through a pivot, a primary braking system operably connected to the cutting assembly, a secondary braking system operably connected to the hinge, and a safety circuit configured to sense an unsafe condition and, in response to sensing the unsafe condition, (i) control the primary braking system to oppose rotation of a blade supported by the cutting assembly, and (ii) control the secondary braking system to oppose rotation of the cutting arm.

In another embodiment, a method of operating an automatic braking system for a pivoting power tool includes supporting a cutting assembly with a cutting arm, sensing an unsafe condition using a safety circuit, controlling with the safety circuit a primary braking system to oppose rotation of a blade supported by the cutting assembly in response to sensing the unsafe condition, and controlling with the safety circuit a secondary braking system to oppose rotation of the cutting arm in response to sensing the unsafe condition.

DESCRIPTION

Figure 1:
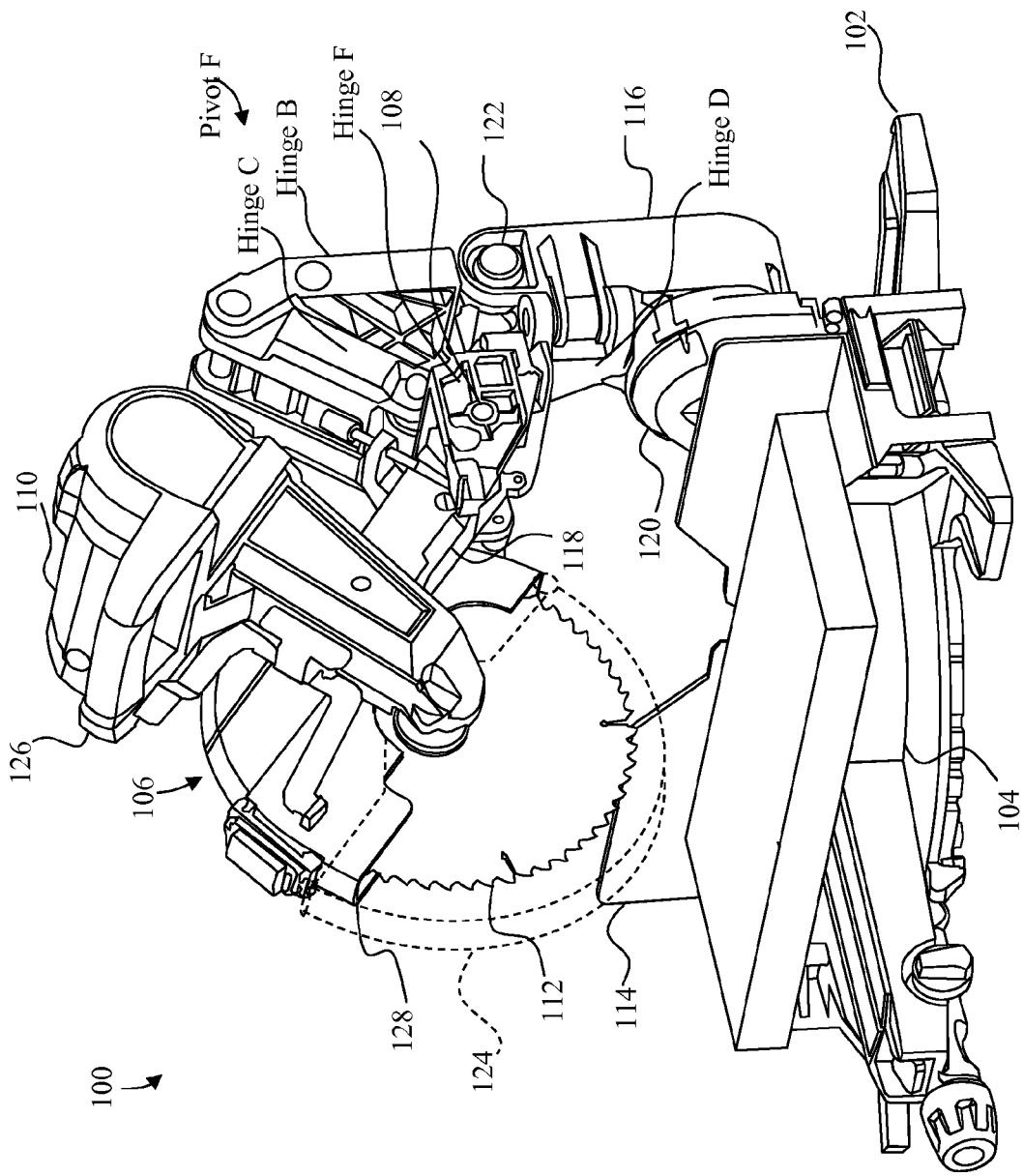
FIG. 1 depicts a front right perspective view of a miter saw assembly.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art to which this disclosure pertains.

Referring now to FIG. 1, there is shown a miter saw assembly 100. The miter saw assembly 100 includes a base 102 and a turntable 104 that is rotatable on the base 102. The miter saw assembly 100 further includes a cutting head 106 mounted on a cutting head support assembly 108. The cutting head 106 (which may also be referred to herein as a "cutting assembly") includes a motor 110 that is operable to rotate a circular saw blade 112. The cutting head support assembly 108 is attached to the turntable 104 and configured to support the cutting head 106 such that the cutting head 106 may move over the turntable 104 and perform cutting operations on a work piece supported by the turntable 104. A rip fence 114 attached to the base 102 may be used to align a work piece thereon.

Figure 2:
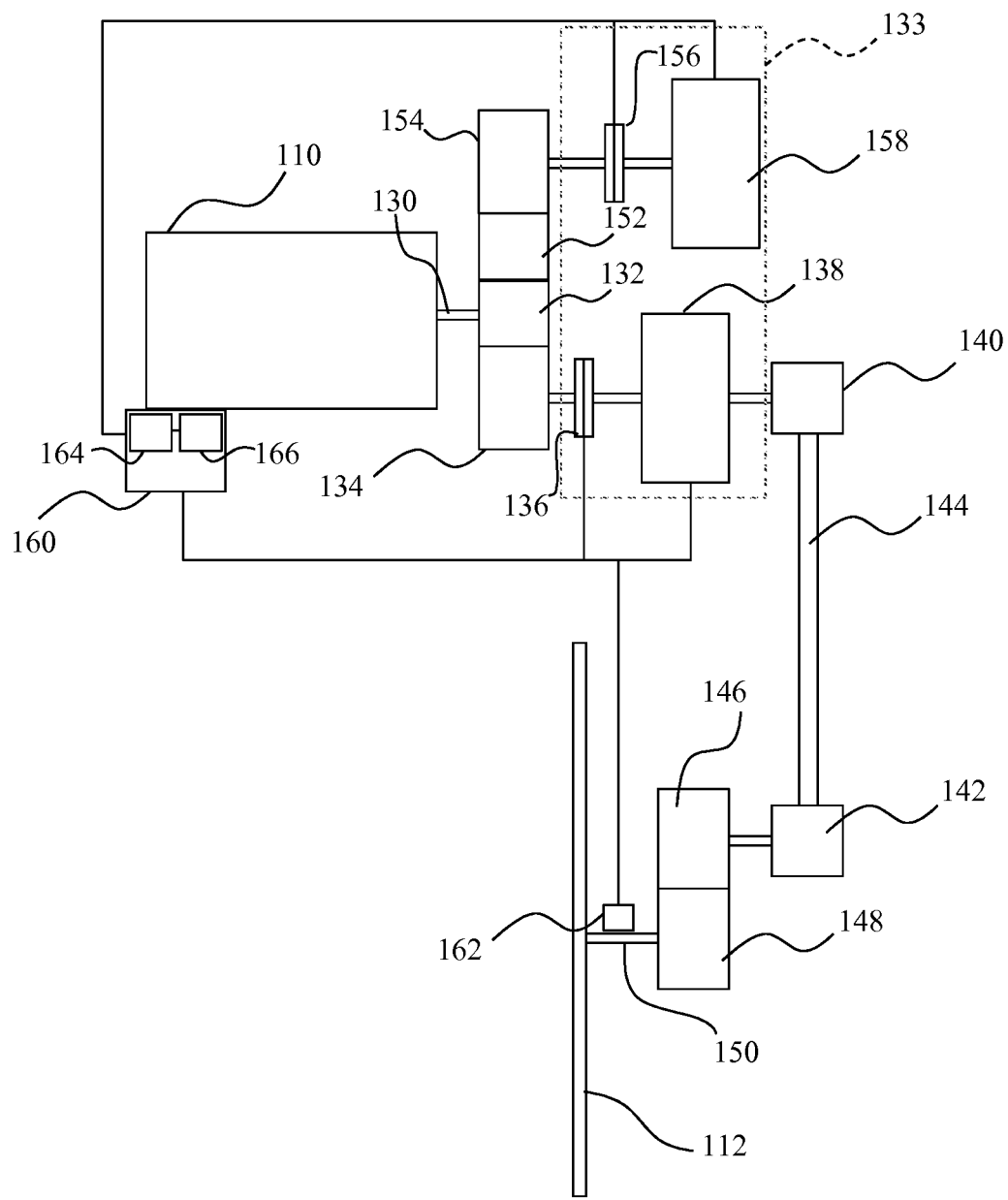
FIG. 2 depicts a schematic diagram of the power transfer train between the motor and the blade including a clutch and a primary braking system.

The cutting head support assembly 108 includes a bevel arm 116, a cutting arm 118, a first pivot mechanism 120, and a second pivot mechanism 122. The bevel arm 116 (also referred to herein as a "bevel post") provides a bevel support structure for the miter saw assembly 100. The bevel arm 116 is pivotally attached to the turntable 104 by the first pivot mechanism 120. The first pivot mechanism 120 includes a hinge arrangement that enables the bevel arm 116 of the support assembly 108 to pivot with respect to the turntable 104 during a setup procedure. In particular, this arrangement is configured to enable the bevel arm 116 to pivot from a vertical position (as shown in FIGS. 1-2) to an angle of 45° (not shown) or more in the leftward direction or rightward direction prior to a cutting operation. This pivoting allows the blade 112 of the cutting assembly 106 to approach the table 104 from a bevel angle and perform angled cuts on a work piece supported on the table 104, as is well known in the art.

The cutting arm 118 of the support assembly 108 provides a support for the cutting assembly 106. The cutting arm 118 is pivotably connected to the hinge F via the pivot F. The pivot F enables pivoting movement of the cutting assembly 106 in relation to the turntable 104 and the base 102 during a cutting operation. This pivoting allows the blade 112 of the cutting assembly 106 to move toward and away from the horizontal turntable 104 to perform a cutting operation. In other embodiments, the cutting arm 118, may be mounted to the hinge F component and the hinge F component is mounted on rails (slide miter saws). Another configuration is for the cutting arm 118 to be mounted on directly on bevel arm 116 with pivot at second pivot 122 (chop saw—non sliding or gliding miter saws).

The cutting assembly 106 includes a handle 126 connected to the cutting arm 118 to facilitate movement of the cutting assembly 106 in relation to the turntable 104. The handle 126 is designed and dimensioned to be grasped by a human hand when performing a cutting operation. This allows the user to easily pivot the cutting assembly 106. A switch (not shown) may be provided on the handle 126 to allow the user to easily energize and de-energize the electric motor 110 during a cutting operation. A blade guard 128 covers the top portion of the circular saw blade 112. A lower blade guard 124, shown in shadow for purpose of clarity, is rotatably mounted to the cutting head assembly 106. The lower blade guard 124 is configured to rotate in a clockwise direction with respect to the cutting head assembly 106 when the cutting head assembly 106 is pivoted toward the turntable 104 thereby exposing the circular saw blade 112.

The connection between the motor 110 and the saw blade 112 is further described with reference to FIGS. 2 and 3. The motor 110 has an output shaft 130 which drives a pinion gear 132. The pinion gear 132 is operably connected to a gear 134 that drives a clutch/brake assembly 133. The output of the clutch/brake assembly is the primary braking assembly 138. The primary braking assembly 138 in one embodiment is the braking assembly described in U.S. Patent Application Publication No. 2011/0048197, the entire contents of which are herein incorporated by reference.

The primary braking assembly 138 drives a pulley 140 which is operably connected to a pulley 142 by a belt 144. In some embodiments, the pulley system is replaced by a geared drive system. The pulley 142 is operably connected to a gear 146 which drives a gear 148 operable connected to a drive shaft 150 on which the blade 112 is mounted. The motor 110, along with the gears and pulleys, are configured such that the blade 112 rotates downwardly.

The pinion gear 132 is also connected to a reversing gear 152. The reversing gear 152 drives a gear 154 that drives a secondary clutch/brake assembly 133. The secondary braking assembly is operatively connected to the hinge F.

FIG. 2 further shows a safety circuit 160 that is operably connected to the secondary clutch/brake assembly 133, a blade sensor 162 (located adjacent to the drive shaft 150 in this embodiment), and the motor 110. The safety circuit 160 includes a processor 164 and a memory 164. Program instructions within the memory 164 are executed by the processor 164 to perform at least some of the actions ascribed to the safety circuit herein. The safety circuit 160 detects when a user approaches too closely or touches the blade 112 and issues a signal which disengages the clutch 136 and activates the primary braking assembly 138 to rapidly stop as discussed in more detail in the '197 Publication.

The safety circuit 160 is further connected to the clutch 156 and the secondary braking assembly 158. Upon sensing a safety condition, a signal is sent to an electromagnet in the clutch/brake assembly 133 and the clutch 156 is released and the secondary braking assembly 158 is activated. Trigger timing of the secondary braking assembly 158 can occur simultaneously with that of the primary braking assembly 138 or after a predetermined time. The timing in some embodiments depends on the particular application (e.g., on miter saw or circular saw). In some miter saw applications such as the embodiment of FIG. 1, the trigger timing is also a function of the rotational position of the cutting head 106. The safety circuit in some embodiments is configured to perform availability/operability testing on the primary and secondary braking systems. In the event of a fault detection of the primary braking system and/or secondary braking system, the safety circuit in some embodiments disables the saw from operating. In other embodiments, in the event of a fault detection of the primary braking system, the safety circuit in some embodiments disables the secondary braking assembly and the saw from operating.

Because the secondary braking assembly 158 works in parallel with the primary braking system 138, a dynamic balancing mechanism is applied to the saw 100. The secondary braking assembly 158 is selected to be similar to the primary braking system 138 to reduce destructive energy generated from the primary braking system 138. The two braking components are sized accordingly.

Figure 3:
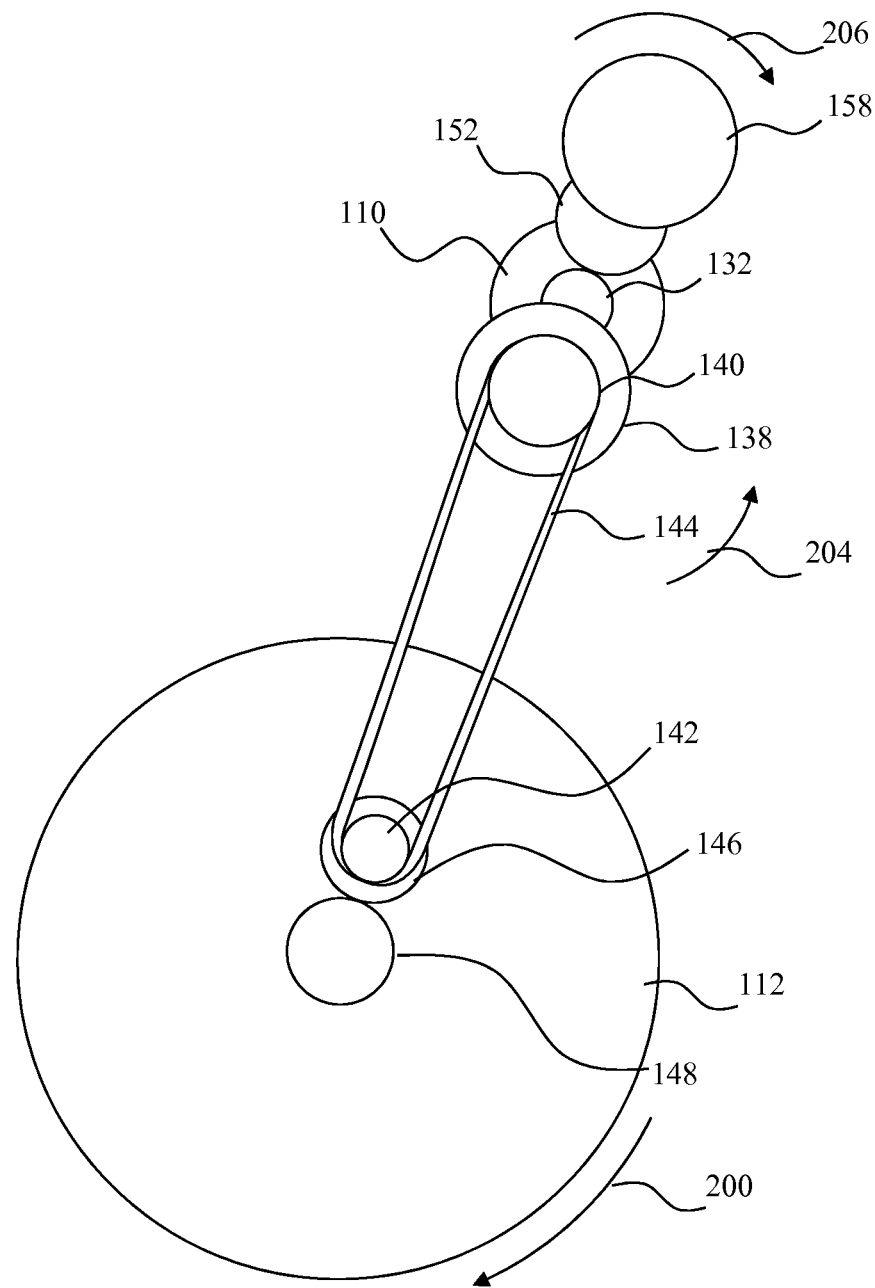
FIG. 3 depicts a simplified plan view of the right side of the power transfer train.
Figure 4:
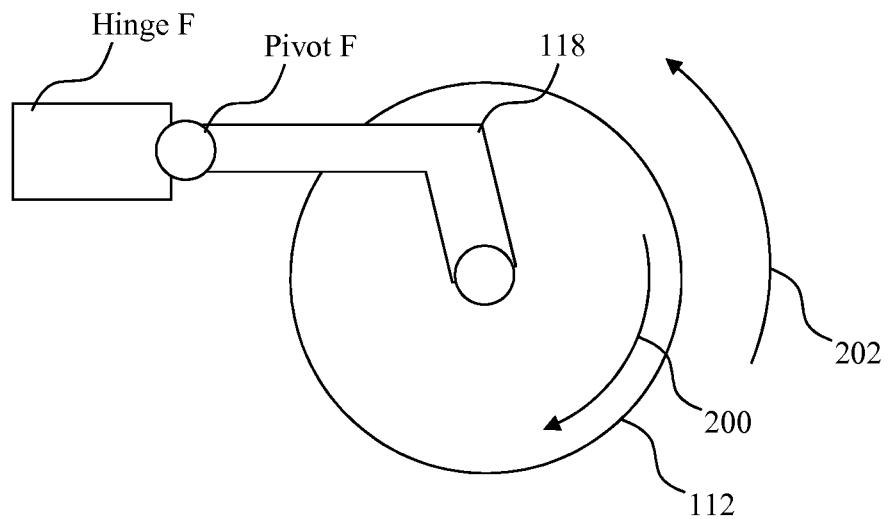
FIG. 4 depicts a simplified left side plan view of a the miter saw assembly of FIG. 1 showing torque generated by activation of the primary braking system.

Accordingly, when the blade 112 is rotating in the direction of the arrow 200 of FIG. 3 and the primary braking system 138 is activated, a large angular momentum in the direction of the arrow 202 of FIG. 4 is generated which forces the cutting arm 118 to pivot about the pivot 122 in the direction of the arrow 202. The secondary braking system 158, however, is rotating in a direction opposite to the primary braking system 138 because of the reversing gear 152 as indicated by the arrows 204 and 206 in FIG. 3. Thus, the secondary braking system 158 generates a large angular momentum in the direction opposite to the arrow 202 of FIG. 4. Sizing of the secondary braking system 158 is necessary as it is desired to minimized the overall tool weight and size. The secondary braking system can be smaller and weigh less than the primary braking system but needs to rotate faster than the primary braking system in order to counteract the force generated by the primary braking system. Other modifications may be used to provide the desired moment arm to counteract the force generated by the primary braking system 138 for other differences between the two systems, such as the location of the systems.

By way of example, in systems which do not include a hinge, the systems described above are modified such that the secondary brake operates on the housing or base of the system. Accordingly, the primary braking system stops rotation of the saw blade in the same manner described above, while the secondary braking system acts, at the same time as, or shortly after activation of the primary braking system, upon the housing or base to reduce movement of the housing or base.

In accordance with the above disclosure, a dynamic mechanism is implemented with a primary brake to reduce output force to the structure of a power tool to enable for braking within a predetermined time to mitigate potential injuries. The dynamic mechanism enables balance and control of a power tool such as miter saw head assemblies and circular saws.

In some embodiments, the dynamic mechanism is a mechanical brake similar to that of the '197 Publication.

In various embodiments, the dynamic mechanism is sized accordingly based on its rotation speed and the primary brake's rotation speed and its moment of inertia.

The dynamic mechanism can be configured with the motor spinning in clockwise or counter-clockwise direction depending upon the particular embodiment.

In some embodiments, the dynamic mechanism is a mechanical brake where braking force can be directed to the blade teeth, blade walls, output shaft, or any drive mechanism. For example, a primary brake can be a mechanical brake such as an aluminum block that makes contact with the blade teeth, or any friction material that makes contact with the blade walls, output shafts, or any drive mechanism In some embodiments, the dynamic mechanism is a pyrotechnic mechanism ejecting a mass. In other embodiments, the dynamic mechanism is an electronic brake generated within the motor assembly.

While shown in a particular configuration, a dynamic mechanism can be configured in any orientation for compactness other than the shown orientation.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

The invention claimed is:

1. A method of operating an automatic braking system for a pivoting power tool, comprising:
   supporting a cutting assembly with a cutting arm;
   sensing an unsafe condition using a safety circuit; controlling with the safety circuit a primary braking system to oppose rotation of a blade supported by the cutting assembly in response to sensing the unsafe condition; and
   controlling with the safety circuit a secondary braking system to oppose rotation of the cutting arm in response to sensing the unsafe condition;
   disengaging with the safety circuit a primary clutch through which the primary braking assembly is operably connected to a motor in response to sensing the unsafe condition; and
   disengaging with the safety circuit a secondary clutch through which the secondary braking assembly is operably connected to the motor in response to sensing the unsafe condition.

2. The method of claim 1 further comprising:
   rotating the blade with the motor through a pulley operably connected to the primary clutch prior to sensing the unsafe condition.

3. The method of claim 1, further comprising:
   generating a first moment of inertia by controlling with the safety circuit the primary braking system to oppose rotation of the blade; and
   generating a second moment of inertia by controlling with the safety circuit the secondary braking system to oppose rotation of the cutting arm, wherein the second moment of inertia has a magnitude substantially the same as the magnitude of the first moment of inertia.

4. The method of claim 1, wherein controlling with the safety circuit the primary braking system to oppose rotation of the blade occurs substantially simultaneously with controlling with the safety circuit the secondary braking system to oppose rotation of the cutting arm.

5. The method of claim 1 further comprising:
   rotating the primary clutch with the motor through a first gear prior to sensing the unsafe condition; and
   rotating the secondary clutch with the motor through a second gear and a reversing gear prior to sensing the unsafe condition.

6. The method of claim 5, wherein:
   rotating the primary clutch comprises rotating the primary braking system at a first speed with the primary clutch;
   rotating the secondary clutch comprises rotating the secondary braking system at a second speed with the secondary clutch; and
   the second speed is greater the first speed.

7. An automatic braking system for a pivoting power tool, comprising:
   a cutting assembly;
   a cutting arm supporting the cutting assembly;
   a hinge supporting the cutting arm through a pivot;
   a primary braking system operably connected to the cutting assembly;
   a secondary braking system operably connected to the hinge; and
   a safety circuit configured to sense an unsafe condition and, in response to sensing the unsafe condition, (i) control the primary braking system to oppose rotation of a blade supported by the cutting assembly, and (ii) control the secondary braking system to oppose rotation of the cutting arm;
   wherein:
   the primary braking assembly is operably connected to a motor through a primary clutch;
   the secondary braking assembly is operably connected to the motor through a secondary clutch; and
   the safety circuit is configured to disengage the primary clutch and the secondary clutch in response to sensing the unsafe condition.

8. The automatic braking system of claim 1, wherein:
   the primary braking assembly is operably positioned between the primary clutch and a pulley, the pulley operably connected to the blade.

9. The automatic braking system of claim 1, wherein:
   the primary clutch is operably connected to the motor through a first gear; and
   the secondary clutch is operably connected to the motor through a second gear and a reversing gear.

10. The automatic braking system of claim 1, wherein the secondary braking assembly is sized to produce a moment of inertia of substantially the same magnitude as a moment of inertia generated by the primary braking assembly.

11. The automatic braking system of claim 10, wherein the secondary braking system is smaller in size than the primary braking assembly.

* * * * *